United States Patent [19]

Sun

[11] Patent Number: 5,096,945
[45] Date of Patent: Mar. 17, 1992

[54] METHOD FOR MAKING RESHAPABLE ARTICLES CONTAINING LIGNOCELLULOSE UTILIZING POLYISOCYANATE RESINS

[75] Inventor: Bernard C. Sun, Chassell, Mich.

[73] Assignee: Board of Control of Michigan Technological University, Houghton, Mich.

[21] Appl. No.: 536,497

[22] Filed: Jun. 11, 1990

[51] Int. Cl.$^5$ ............................................. C08L 89/00
[52] U.S. Cl. ........................................................ 524/13
[58] Field of Search ........................................... 524/13

[56] References Cited

U.S. PATENT DOCUMENTS 3,557,263  1/1971  Marra ..................................... 264/45
4,546,039 10/1985  Horacek et al. ..................... 428/357

OTHER PUBLICATIONS

Frink et al. "Isoyanate Binders for Wood Composite Boards" Urethane Chemistry and Applications, American Chemical Society, 1981, pp. 285–309.
Proceedings of 1980 Symposium—"Wood Adhesives—Research Application and Needs", USDA Forest Service, Forest Products Laboratory, p. 117–121.
Deppe et al., *Holz als Roh-und Werkstoff*, 29(2):45–50 (1971).
Fahey et al., *Tappi*, The Role of Phenolic Resin in Imparting Properties to Dry-Formed Hardboards, 56(3):53–56 (1973).
McLaughlin et al., Proc. 15th Particleboard Symposium, Wash. State Univ., pp. 255–264 (1981).
Johns et al., Proc., 18th Particleboard Symposium, Wash. State Univ., pp. 101–116 (1984).
Galbraith et al., Proc., 19th Particleboard Symposium, Wash. State Univ., pp. 301–322 (1985).

*Primary Examiner*—Nathan M. Nutter
*Attorney, Agent, or Firm*—Michael, Best & Friedrich

[57] ABSTRACT

Reshapable composite material and/or articles formed from lignocellulose-containing materials and having improved strength and water resistance characteristics are made by applying about 7 to about 100 weight % of a polyisocyanate resin to fibers and/or fiber bundles of a lignocellulose-containing material. The resulting mixture or furnish is compression molded to form a composite material and/or article of the desired shape and dimensions.

7 Claims, No Drawings

METHOD FOR MAKING RESHAPABLE ARTICLES CONTAINING LIGNOCELLULOSE UTILIZING POLYISOCYANATE RESINS

BACKGROUND OF THE INVENTION

1. Field of the Invention

This invention relates to methods of making articles from lignocellulose-containing materials, and, more particularly, to methods for compression molding lignocellulose-containing fibers into composite articles.

2. Description of the Prior Art

It is well known to manufacture composite materials and articles from lignocellulose-containing material by mixing a suitable binder with a lignocellulose-containing raw material in comminuted form, such as wood fibers, wood flakes, wood chips, wood strands, wafers and the like, and then compression molding the resulting mixture or so-called furnish under heat to bond the material together in a densified form of the desired shape. Uses of such lignocellulosic composite materials and articles include hardboard, medium density fiberboard, insulation board, flakeboard, chipboard, strandboard, waferboard, molded products and the like.

Urea-formaldehyde and phenol-formaldehyde resins are most widely used as the binder for bonding lignocellulosic fibers into composite articles. The composite articles produced with these resins tend to have relatively low strength, poor durability, high hygroscopicity, excessive thickness swelling, and a lack of fungal decay resistance. The low material strength and durability limit their uses to structurally less demanding applications. The hygroscopicity and excessive thickness swelling limit their uses to relatively dry environments as they tend to swell excessively and lose most of their strength when exposed to moist conditions for an extended period of time.

Producing composite materials and articles from lignocellulosic fibers, such as high density hardboards, medium density hardboards, tempered hardboards, industrialite hardboards, medium density fiberboards, insulation boards, molded articles, and the like, can be advantageous because low quality logs, wood mill residues, plants, and agricultural crops and residues are utilized as the primary raw material. Present composite materials made from lignocellulosic fibers, typically have one or more shortcomings which limit their applications and markets to structurally less demanding and dry service conditions. Such shortcomings include low strength, poor waterproof quality, unstable dimension, high hygroscopicity, non-durable under exterior and/or moist service conditions, and little resistance to acids and alkalies. Developing a method for making high performance, high quality composite materials and articles from lignocellulosic fibers which are largely free from most of these aforementioned shortcomings has been the subject of many research and development efforts. However, only limited success has been attained and thus remains the need for an effective and simple method for making high performance composite materials and articles from lignocellulosic fibers. Uses of such composite materials and articles can be expanded into applications and markets never before considered possible for composite materials made from lignocellulosic fibers.

Polyisocyanate resin levels up to 8% have been used to make particleboards from wood chips or particles, and the highest dry bending MOR (maximum bending strength) and IB (tensile strengths perpendicular to specimen face) were estimated to be 2,600 and 260 psi, respectively. Wilson, J. B., Proceedings of 1980 Symposium - "Wood Adhesives - Research, Application, and Needs", USDA Forest Service, Forest Products Laboratory, p. 117-121 (1980). Polyisocyanate application levels up to 15% have been used to make particleboards and the highest bending MOR and IB strength obtained was estimated to be about 5,200 and about 180 psi, respectively. Deppe et al., *Holz als Roh-und Werkstoff*, 29(2):45-50 (1971). Other studies have shown that increasing polyisocyanate resin levels from 4% to 10% resulted in little improvement in strength properties of aligned flakeboard.

Studies have been made on dry-formed high density hardboard made from ponderosa pine fibers to determine the effect of using bonding and/or fiber-penetrating phenol-formaldehyie resins in amounts, to up to 18% resins. The highest dry strengths obtained were 8,060 psi for bending MOR, 450 psi for IB, and 4,710 psi for tensile strength parallel to specimen surface. Fahey et al., *Tappi*, 56(3):53-56 (1973). These results indicate that increasing the amount of binder used in the production of wood particleboards, flakeboards and hardboards above about 3% does not result in any significant improvement in material strength properties.

Polyisocyanate resins have been used as binders in the manufacture of composite articles from lignocellulose-containing materials. This is exemplified in Marra U.S. Pat. No. 3,557,263, issued Jan. 19, 1971, which discloses mixing an isocyanate prepolymer resin with elongated wood sticks under conditions which cause the prepolymer to foam and harden into a solid binder. The resulting composite product is a loose matrix of wood sticks having a void volume between about 40% to 80%. Neither pressure nor heat is used in the formation of the product, so it has a low material strength, low durability, and low water resistance. Horacek et al. U.S. Pat. No. 4,546,039, issued Oct. 8, 1985, discloses the use of a polyol-polyisocyanate prepolymer as a binder to bond lignocellulose-containing materials.

Polyisocyanate resins in amounts up to about 6% have been used to make medium density fiberboard, McLaughlin et al., Proc., 15th Particleboard Symposium, Wash. State Univ., pp. 255-264 (1981) and Johns et al., Proc., 18th Particleboard Symposium, Wash. State Univ., pp. 101-116 (1984) and hardboard, Galbraith et al., Proc., 19th Particleboard Symposium, Wash. State Univ., pp. 301-322 (1985). Applicant is unaware of any prior art methods employing polyisocyanates in amounts greater than about 6% to form composite materials or articles from lignocellulosic fibers, as distinguished from chips, flakes, strands, wafers, sawdust, and the like.

SUMMARY OF THE INVENTION

It is an object of the present invention to make lignocellulosic fiber composite materials and articles with improved strength, durability, hygroscopicity, dimensional stability, resistance to chemicals, and reshapability.

It is another object of the present invention to provide a method which utilizes lignocellulosic fibers and polyisocyanate resins as its raw materials to make high quality and/or reshapable lignocellulosic fiber composite materials and articles.

It is yet another object of the present invention to provide a simple method for making high quality lignocellulosic fiber composite materials and articles which is able to utilize the present dry-process hardboard and medium density fiberboard production equipment.

The invention provides a method for making composite materials and articles from lignocellulosic fibers. The composite materials and articles are reshapable and have improved material strength, durability, dimensional stability, hydrophobicity and water resistance.

The method includes the steps of applying to lignocellulosic fibers about 7 to about 100 weight % of a polyisocyanate resin, based on the oven dry weight of the lignocellulosic fibers, and then applying heat and pressure to the resulting mixture for a sufficient period of time to form an article of the desired shape and dimensions.

DESCRIPTION OF THE PREFERRED EMBODIMENT

As used herein, the term "lignocellulose-containing fibers ("lignocellulosic fibers") includes fibers and fiber bundles of wood, flax, bagasse and the like as well as fibrous forms of agricultural products such as nut shells, straw, flax, hulls from cereal grains, plant stalks and the like. The size and geometry of the lignocellulosic fibers and fiber bundles are not particularly critical. This fiber size, particularly the length and diameter, will vary depending on the species of starting material used. For example, the lignocellulosic fibers of U.S. commercial woods, typically range from about 0.5 to about 8 mm long and from about 5 to about 80 micrometers in diameter. A fiber bundle can contain up to 100 or more individual fibers. The fiber bundle size will vary depending on the method of fiberization and the degree of pulping. The terms "fibers" and "fiber bundles" do not include particles such as flakes, strands, wafers and the like.

The lignocellulosic fibers can be prepared by conventional methods of fiberization or pulping, such as chemical, mechanical, chemical-mechanical and thermal-mechanical.

Also, various suitable reinforcing materials can be admixed to the lignocellulosic fibers, such as whiskers, filaments, wools, plastics, woven fabrics of alumina, asbestos, beryllium, boron, carbon (graphite), ceramics, glasses, kevlar, molybdenum, nylon, polyethylene, rocks, silicon carbide, steel, titanium, tungsten, other metal, as well as various other thermosetting and thermoplastic resins (polymers). In addition, wax can be admixed with lignocellulosic fibers to improve the water resistance of the resulting product.

The moisture content of the lignocellulosic fibers is not particularly critical. While oven dry fibers can be used, higher moisture contents are preferred because the cost of drying can be reduced. Further, with higher moisture contents, water is available for reaction with polyisocyanate to form polymers, and the fibers are more pliable when compressed, thereby enhancing surface contact between the fibers during compression to increase the formation of physical and chemical bonds and improve composite material properties. The moisture content of the fibers preferably is about 1 to about 50 weight % of the fibers, based on the oven dry weight of the fibers.

Suitable polyisocyanate resins contain two or more isocyanate functional groups and include aliphatic, cycloaliphatic and aromatic polyisocyanates, and combinations thereof. Examples of these polyisocyanates are diphenylmethane 4,4-, 2,4- and 2,2-disocyanates, polymethylene polyphenyl isocyanates, triphenylmethane triisocyanate, toluene-2,4- and 2,6-disocyanates, cyclohexane 2,4- and 2,3-disocyanates, as well as other disocyanates, triisocyanates, tetraisocyanates and the like, and mixtures thereof. At present the diphenylmethane disocyanates are the preferred polyisocyanates.

The polyisocyanates can be applied to the lignocellulosic fibers as is or after mixing with various suitable solvents and/or emulsifiers and applied as an emulsion of suitable viscosity. The amount of polyisocyanate applied to the lignocellulosic fibers is about 7 to about 100, preferably about 8 to about 50, and most preferably about 10 to about 30 weight %, based on the oven dry weight of the fibers.

While the polyisocyanate resin can be applied to the fibers in any suitable manner, it preferably is sprayed in liquid form onto the fibers in suitable equipment, such as a blender, mixer, cyclone, drying tube or the like, which will blend or mix the resin and fibers together.

After the polyisocyanate resin is applied to the fibers, the resulting mixture or furnish is formed into a loose mat in a mat former and is then compression molded for a sufficient period of time to form a composite material or article of the desired shape and dimensions. The application of heat and pressure consolidates the furnish to produce a material and/or article having a densified matrix with negligible voids. The consolidated material and/or article has a significantly higher material strength, durability and water resistance than composites made with prior methods.

Pressing temperatures, pressures and times vary widely depending on the thickness and the desired density of the composite material or article, size and nature of lignocellulosic fibers, the moisture content of the mat, the quantity and specific polyisocyanate resin used, and the kind and quantity of catalyst used, if any. The pressing temperature used is sufficient to at least partially polymerize the resin and/or cause the polyisocyanate resin to react with the fibers within a reasonable time. Generally, a pressing temperature ranging from about 60 to about 420° F. can be used. The preferred pressing temperature is from about 200° F. to about 400° F. if no catalyst is used. The most preferred pressing temperature is from about 220° to about 350° F.

The pressure should be sufficient to press the fibers into intimate contact with each other without a resultant degradation in structural and property integrity. This pressure usually varies with the characteristics of lignocellulosic fibers and their species origin, mat chemical composition and physical state, and final composite material density.

The pressing time is sufficient to at least partially polymerize the resin to a point where the composite material and article have sufficient integrity for handling and further processing. The press time varies with mat chemical composition and press temperature. A suitable catalyst can be added to the mixture of resin and fibers to increase the rate at which the resin polymerizes and thereby decrease the press time.

Use of relatively high amounts of polyisocyanate resins in accordance with the invention reinforces the composite material and article because resin not required for bonding the fibers directly is available to form additional polymers and copolymers of lignocellulose-urethane (the reaction product between lignocellulose and polyisocyanate), and polyurea (the reaction product between the water in the fibers and polyisocyanates). These additional polymers and copolymers further reinforce and modify the composite material and article.

The following examples are illustrative of the present invention and show the improved characteristics of composite articles produced in accordance with the invention. It should be understood that the scope of the present invention is not limited to the following examples.

EXAMPLE 1

A liquid polyisocyanate resin (polymethylene polyphenyl isocyanate resin, Mondur E-441, Mobay Chemical Corporation) and phenol-formaldehyde resin (GP-2357, Georgia Pacific Corporation) were sprayed to the thermal mechanically pulped aspen wood fibers in a blow-line blender. The weight ratios of the resin to fiber in the test panels were 3%, 10%, 20% and 30%. The 3% ratio was selected to represent a conventional method for making high density hardboards. After the resin was applied to the fibers, measured quantities of the resin and fiber mixture was dry-formed into loose fibermats. After cold prepressing at room temperature and 100 psi for one minute, the fibermats were then hot pressed into 16" wide × 18" long × 0.125" thick panels having a targeted specific gravity of 1.00. The fibermats containing the polyisocyanate resin were hot pressed at a temperature of 260° F. for 165 seconds while the fibermats containing the phenol-formaldehyde resin were hot pressed at a temperature of 390° F. for 210 seconds. The resulting panels were then cut into test specimens and conditioned to a state of equilibrium by placing them in 65 ± 1% relative humidity and 68 ± 6° F. prior to testing. The results from these tests are summarized in Table I.

From these results, it can be seen that the material strength of the wood fiber panels containing a polyisocyanate resin at levels within the invention is substantially greater than the material strength of the wood fiber panels containing the phenol-formaldehyde resin at all resin to fiber ratios.

Further, the dry MOR, dry IB and dry tensile strengths obtained when adding polyisocyanate resin to fibers are substantially higher than these same characteristics for particleboard at similar polyisocyanate application levels.

EXAMPLE 2

The liquid polyisocyanate and phenol-formaldehyde resins of Example 1 were sprayed onto thermal mechanically pulped aspen wood fibers in a blow-line blender. The weight ratios of resin to fiber in the test samples were 3%, 10%, 20% and 30%. The 3% ratio was used to represent a conventional method for making high density hardboards. After the resin was applied to the fibers, measured quantities of the resin and fiber mixture was dry-formed into loose fibermats. After cool prepressing at room temperature and 100 psi for 1 minute, the fibermats were then hot-pressed into 16" wide × 18" long × 0.125" thick panels having a targeted specific gravity of 1.00. The fibermats containing the polyisocyanate resin were hot-pressed at a temperature of 260° F. for 165 seconds while the fibermats containing the phenol-formaldehyde resin were hot pressed at a temperature of 390° F. for 210 seconds. The resulting panels were then cut into test specimens and conditioned to a state of equilibrium by placing them in conditions of 65 ± 1% relative humidity and 68 ± 6° F. After taking measurements, the specimens were then soaked in 68 ± 6° F. water for 24 hours and measurements were taken again for determining their water absorption and thickness swelling. The results from these tests are summarized in Table II.

TABLE I

Material Strengths of Resin Reinforced Wood Fiber Composite Panels (1)

| RESIN TYPE | RESIN TO FIBER RATIO % | WEIGHT PERCENT RESIN | WEIGHT PERCENT WOOD | SPECIMEN SPECIFIC GRAVITY | DRY TENSILE (2) psi | WET TENSILE (2,3) psi | DRY MOR (4) psi | WET MOR (3,4) psi | DRY IB (5) psi |
|---|---|---|---|---|---|---|---|---|---|
| Isocya- | 3 | 2.9 | 97.1 | 1.01 | 8,478 | 3,705 | 10,578 | 3,535 | 535 |
| nate | 10 | 9.1 | 90.9 | 1.09 | 11,098 | 7,254 | 15,614 | 6,872 | 1,258 |
|  | 20 | 16.7 | 83.3 | 1.09 | 11,460 | 9,153 | 16,933 | 10,629 | 1,513 |
|  | 30 | 23 | 76 | 1.11 | 9,955 | 9,530 | 17,504 | 12,749 | 1,411 |
| Phenol- | 3 |  |  | 1.02 | 4,442 | 1,169 | 7,647 | 2,299 | 287 |
| Formal- | 10 |  |  | 1.03 | 6,183 | 2,711 | 9,874 | 4,752 | 402 |
| dehyde | 20 |  |  | 1.04 | 5,736 | 3,378 | 9,823 | 5,603 | 284 |
|  | 30 |  |  | 1.09 | 6,643 | 4,409 | 11,906 | 8,436 | 716 |

Notes:
(1) Values in Table I are average of ten individual test values - two specimen from each of the five laboratory made panels. Fibermat moisture content varies with resin application level.
(2) Maximum tensile strength parallel to test specimen surface.
(3) Wet strengths were determined after soaking test specimens in 68° F. water for 24 hours in vertical position.
(4) Maximum static bending strength (MOR).
(5) Dry IB (internal bond strength or dry tensile strength perpendicular to test specimen surface).

TABLE II

Water Absorption and Thickness Swelling of (1) Resin Reinforced Wood Fiber Composite Panels

| RESIN TYPE | RESIN TO FIBER RATIO | SPECIMEN SPECIFIC GRAVITY | WATER (2) ABSORPTION % | THICKNESS (2) SWELLING % |
|---|---|---|---|---|
| Isocya- | 3 | 1.00 | 39.9 | 25.4 |
| nate | 10 | 1.01 | 16.3 | 9.7 |
|  | 20 | 1.07 | 7.8 | 4.5 |
|  | 30 | 1.09 | 5.3 | 2.5 |

TABLE II-continued

Water Absorption and Thickness Swelling of (1)
Resin Reinforced Wood Fiber Composite Panels

| RESIN TYPE | RESIN TO FIBER RATIO | SPECIMEN SPECIFIC GRAVITY | WATER (2) ABSORPTION % | THICKNESS (2) SWELLING % |
| --- | --- | --- | --- | --- |
| Phenol- | 3 | 0.97 | 65.4 | 44.0 |
| Formal- | 10 | 1.03 | 35.6 | 21.1 |
| dehyde- | 20 | 1.02 | 31.0 | 14.5 |
|  | 30 | 1.07 | 19.9 | 7.8 |

Notes:
(1) Values in Table II are average of ten individual test values - two specimens from each of the five laboratory made panels. Fibermat moisture content varies with resin application level.
(2) Water absorption and thickness swelling for test specimens after soaking in 68 ± 6° F. water for 24 hours in vertical position.

From these results, it can be seen that the water absorption for the wood fiber composite panels containing the polyisocyanate resin is lower than that for the panels containing the phenol-formaldehyde resin at all resin to fiber levels. The lower water absorption corresponds to a better water resistance or hydrophobicity. This low water absorption of the panels containing higher levels of the polyisocyanate resin also gives the panels better fungal decay resistance than the panels containing the phenol-formaldehyde resin because growth of wood-decaying fungi requires the average moisture content to be higher than about 20%. Also, these results show a lower thickness swelling for the wood fiber composite panels containing the polyisocyanate resin than for the panels containing the phenol-formaldehyde resin. This lower thickness swelling corresponds to a better thickness dimensional stability.

Further, the water absorption and thickness swelling obtained with adding polyisocynate resin to fibers are substantially lower than these same characteristics for particle board at similar polyisocyanate application levels.

EXAMPLE 3

The liquid polyisocyanate and phenol-formaldehyde resins of Example 1 were sprayed onto thermal mechanically pulped aspen wood fibers in a blow-line blender. The weight ratios of resin to fiber in the test samples were 3%, 10%, 20% and 30%. The 3% ratio was used to represent a conventional method for making high density hardboards. After the resin was applied to the fibers, measured quantities of the resin and fiber mixture was dry-formed into loose fibermats. After cold pre-pressing at 100 psi for one minute, the fibermats were then hot-pressed into 16" wide × 18" long × 0.125" thick panels having a targeted specific gravity of 1.00.

The fibermats containing the polyisocyanate resin were hot-pressed at a temperature of 260° F. for 165 seconds while the fibermats containing the phenol-formaldehyde resin were hot-pressed at a temperature of 390° F. for 210 seconds. The resulting panels were then cut into test specimens and conditioned to a state of equilibrium by placing them in 65 ± 1% relative humidity and 68 ± 6° F. prior to testing.

After taking measurements the specimens were tested for durability and waterproof quality by being subjected to six complete cycles of extremely severe conditions of ASTM-1037-120 accelerated aging. Each cycle consisted of soaking the specimen in 120° F. water for one hour, subjecting the specimen to 200° F. steam and water vapor for three hours, placing the panel in a 10° F. freezer for twenty hours, heating and drying the specimen in an oven in 210° F. air for three hours, steaming the specimen again in 200° F. steam and water vapor for three hours, and finally heating and drying the panel in an oven at 210° F. for eighteen hours. All specimens were again allowed to reach a state of equalibrium by placing them in 65 ± 1% relative humidity and 68 ± 6° F. temperature. The conditioned specimens were then tested for durability and waterproof quality by determining their tensile strength, bending MOR, IB and thickness swelling. The results from these tests are summarized in Table III.

TABLE III

Durability of Resin Reinforced Wood Fiber Composite Panels (1)

| RESIN TYPE | RESIN TO FIBER RATIO | SPECIMEN SPECIFIC GRAVITY | DRY (2) TENSILE psi | DRY (3) MOR psi | DRY (4) IB psi | THICKNESS SWELLING (5) % |
| --- | --- | --- | --- | --- | --- | --- |
| Isocya- | 3 | 0.92 | 7,018 | 8,349 | 252 | 15.0 |
| nate | 10 | 0.89 | 9,268 | 13,298 | 1,033 | 4.9 |
|  | 20 | 0.92 | 10,127 | 12,881 | 1,297 | 2.4 |
|  | 30 | 1.05 | 9,051 | 13,870 | 1,428 | 1.9 |
| Phenol- | 3 | 0.94 | 1,779 | 3,768 | 26 | 81.1 |
| Formal- | 10 | 0.95 | 4,298 | 6,455 | 175 | 21.5 |
| dehyde | 20 | 0.99 | 4,285 | 6,942 | 229 | 12.9 |
|  | 30 | 1.01 | 4,316 | 7,145 | 656 | 4.5 |

Notes:
(1) Values in Table III are average of five individual test values - one specimen from each of the five laboratory made panels. Fibermat moisture content varies with resin application level.
(2) Dry maximum tensile strength parallel to test specimen surfaces after accelerated aging.
(3) Dry MOR or maximum static bending strength after accelerated aging.
(4) Dry IB (internal bond strength or tensile strength perpendicular to test specimen surfaces) after accelerated aging.
(5) Thickness swelling after accelerated aging.

From these results, it can be seen that the durability of the panels containing a polyisocyanate resin is greater than the durability of the panels containing a phenol-formaldehyde resin. The panels containing the polyisocyanate resin had substantially higher material strengths than the panels containing the phenol-formaldehyde resin after being subjected to extreme conditions at all the resin to fiber ratios tested. These results also show that the panels containing polyisocyanate resin had a lower thickness swelling than the panels containing the phenol-formaldehyde resin at all the resin to fiber ratios. This lower thickness swelling corresponds to a better thickness dimensional stability. The high strengths and low thickness swelling correspond to a better waterproof quality.

Further, the dry bending MOR, dry IB and dry tensile strengths obtained when adding polyisocyanate resin to fibers are substantially higher than these same characteristics for particleboard at similar polyisocyanate application levels while the thickness swelling obtained when adding polyisocyanate resin to fibers was substantially lower than the thickness swelling for particleboard at similar polyisocyanate application levels.

EXAMPLE 4

The liquid polyisocyanate resin of Example 1 was sprayed onto thermal mechanically pulped aspen wood fibers in a blow-line blender. The weight ratio of polyisocyanate resin to fiber was 15%. The liquid phenol-formaldehyde resin of Example 1 was sprayed onto a second batch of aspen wood fibers in a blow-line blender. The weight ratio of phenol-formaldehyde resin to fiber was 3%, as is conventional commercial practice. Measured quantities of resin and fiber mixtures were then dry-formed into loose fibermats. After cold prepressing at 100 psi for one minute the fibermats were then hot-pressed into 16" wide × 18" long × 0.125" thick panels having a targeted specific gravity of 1.00. The fibermats containing the polyisocyanate resin were hot-pressed at a temperature of 260° F. for 165 seconds while the fibermats containing the phenol-formaldehyde resin were hot-pressed at a temperature of 390° F. for 210 seconds. The panels were then cut into 1" wide × 18" long strips.

To demonstrate the reshapability of the polyisocyanate resin modified lignocellulosic fiber composite materials, test strips made from the polyisocyanate and phenol-formaldehyde resins were soaked in room temperature water for 16 hours, and heated with contact pressure in a hot press at 250 ± 5° F. for 30 seconds. The test strips were then hand-rolled around a two-inch diameter plastic pipe. The test strip modified with the polyisocyanate resin reshaped well, did not delaminate and break and held its shape upon cooling. It also displays strong elastic property. However, when the test strip bonded with the phenol-formaldehyde resin was hand-rolled around the same two-inch diameter plastic pipe, it delaminated and broke. Composite articles made by conventional methods do not have such a capability of being reshaped.

From the foregoing description, one skilled in the art can make various changes and modifications to adopt the invention to various usages and conditions without departing from the spirit and scope of the invention.

What is claimed is:

1. In a method for making lignocellulosic fiber composite material from lignocellulosic fibers in which a binder is applied to fibers of a lignocellulosic material and the resulting mixture is pressed into a composite material of the desired shape and dimensions, said method comprising the steps of,
   (a) applying to said fibers of a lignocellulosic material about 10 to about 30 weight % of a polyisocyanate resin, based on the oven dry weight of said fibers; and
   (b) applying heat and pressure to the resulting mixture for a sufficient period of time to form a composite material of the desired shape and dimensions.

2. The method of claim 1 wherein said polyisocyanate resins contain two or more isocyanate functional groups.

3. The method of claim 2 wherein said polyisocyanate resin is a diphenylmethane polyisocyante.

4. The method of claim 1 wherein said composite material is an article.

5. The method of claim 1 wherein the diameter of said fibers is about 5 $\mu M$ to about 80 $\mu M$.

6. A reshapable product made by compression molding a mixture of lignocellulosic fibers and about 10 to about 30 weight % of a polyisocyanate resin, based on the oven dry weight of said fibers, into the desired shape.

7. The reshapable product of claim 6 wherein said polyisocyanate resin is a diphenylmethane polyisocyanate.

* * * * *